(12) United States Patent
Baumgartner et al.

(10) Patent No.: US 7,047,340 B1
(45) Date of Patent: May 16, 2006

(54) DATABUS AND METHOD FOR THE COMMUNICATION OF TWO ASSEMBLIES BY MEANS OF SUCH A DATABUS

(75) Inventors: Robert Baumgartner, Wörth (DE); Norbert Hersch, München (DE)

(73) Assignee: Oce Printing Systems GmbH, Poing (DE)

( * ) Notice: Subject to any disclaimer, the term of this patent is extended or adjusted under 35 U.S.C. 154(b) by 0 days.

(21) Appl. No.: 09/807,352

(22) PCT Filed: Oct. 12, 1999

(86) PCT No.: PCT/EP99/07632

§ 371 (c)(1),
(2), (4) Date: Jun. 28, 2001

(87) PCT Pub. No.: WO00/25225

PCT Pub. Date: May 4, 2000

(30) Foreign Application Priority Data

Oct. 12, 1998 (DE) .............................. 198 46 914

(51) Int. Cl.
*G06F 13/14* (2006.01)
(52) U.S. Cl. ....................... 710/305; 710/310
(58) Field of Classification Search ................ 711/147, 711/151; 710/305, 107, 119, 121
See application file for complete search history.

(56) References Cited

U.S. PATENT DOCUMENTS

| | | | | |
|---|---|---|---|---|
| 4,918,645 | A * | 4/1990 | Lagoy, Jr. .................... | 711/151 |
| 5,337,411 | A * | 8/1994 | Harrison, Jr. ................ | 709/253 |
| 5,572,687 | A | 11/1996 | Alnuweiri | |
| 5,758,188 | A * | 5/1998 | Appelbaum et al. .......... | 710/35 |
| 5,774,001 | A * | 6/1998 | Mozdzen et al. ........... | 327/141 |
| 6,247,084 | B1 * | 6/2001 | Apostol et al. ............. | 710/108 |

FOREIGN PATENT DOCUMENTS

| | | |
|---|---|---|
| EP | 0 287 119 | 10/1988 |
| EP | 0 582 535 A1 | 2/1994 |
| WO | WO 91/10 958 A1 | 7/1991 |
| WO | WO 92/21088 | 11/1992 |

OTHER PUBLICATIONS

Ammar, "Understanding Advanced Bus-Interface Products", Texas Instruments, SCAA029, May 1996, vi+41 pp.*
Packer et al., "Message Passing Supports Multiple Processor Design", Computer Design/Jun. 15, 1984, pp. 117-124.
IEEE Standard for High-performance Synchronous 32 Bit Bus: Multibus II.
Bussysteme, Parallele und serielle Bussysteme, Iokale Netze, 1987.
20 MHZ Multibus II Parallel System Bus Investigation.

* cited by examiner

*Primary Examiner*—Rehana Perveen
*Assistant Examiner*—Clifford Knoll
(74) *Attorney, Agent, or Firm*—Schiff Hardin LLP

(57) ABSTRACT

A parallel databus assembly and method includes modules connected to parallel signal lines, each of the modules having a databus driver being in immediate connection with the signal lines and a controller connected to the databus driver. At least some of the parallel signal lines are data lines for transmitting data or control lines for controlling the data transmission of the data via the data lines. A clock generator for generating a bus frequency with which the signals transmitted in the signal lines are clocked is connected to the databus drivers. The databus drivers are fashioned such that the signals to be transmitted from and to the data lines and the control lines are accepted during a clock pulse prescribed by the clock generator and are emitted during a following clock pulse.

12 Claims, 9 Drawing Sheets

DATABUS AND METHOD FOR THE COMMUNICATION OF TWO ASSEMBLIES BY MEANS OF SUCH A DATABUS

BACKGROUND OF THE INVENTION

1. Field of the Invention

The present invention relates to a parallel databus and to a method for the communication of two assemblies by means of such a databus. The invention particularly refers to a parallel databus, which is suitable for a multiprocessor architecture. Given such a multiprocessor architecture, a plurality of processor systems basically having equal rights can communicate with one another via the databus.

2. Description of the Related Art

The multibus II (multibus is a registered trademark of the Intel Corporation) represents such a databus. The multibus II is a synchronized bus defined in IEEE Standard for a High-Performance Synchronous 32-bit bus: MULTIBUS II, The Institute of Electrical and Electronics Engineers, Inc., 345 East 47th Street, NY 10017, USA, 1988. In order to make it more simple, the "MULTIBUS II" is referred to as "multibus" in the following.

The hardware realization of such a multibus consists of a backplane, in which the signal lines of the bus are arranged and which are provided with approximately 20 cable connectors, whereby an assembly can be respectively connected thereto. FIG. 3 schematically shows two assemblies 2 that are connected via a multibus 1. Each assembly 2 has a databus driver 3 that is immediately connected to the signal lines of the multibus 1 and has a controller 4 that is connected to the databus driver 3. The controller 4, in turn, is connected to the electronic physical units of the assembly 2. These electronic physical units can have a processor or merely represent a passive digital circuit.

The controller 4, corresponding to the protocol of the multibus 1, logically edits the data generated by the electronic physical units and forwards them to the databus driver 3. The databus driver 3 converts the data into electrical data signals that are appropriate for the multibus and applies the electrical data signals to the signal lines. Data signals coming from the multibus 1, in a reversed way, are accepted by the databus driver, which forwards the data to the controller 4. The controller 4 correspondingly edits the data for the processing by the electronic physical units.

The databus drivers are transparent electronic physical units, i.e., the respective corresponding input side and output side of the databus driver assumes the same logical value. Since the databus drivers are transparently fashioned, an active connection between two assemblies 2 is logically through-switched from the controller 4 of the one assembly 2 to the controller 4 of the other assembly 2.

The signal propagation time between the two controllers 4 limits the maximum transmission frequency or, respectively, bus frequency. Corresponding to the aforementioned IEEE standard, the bus frequency is 10 MHz. A transmission rate of 40 byte/s is obtained by such a bus frequency.

A study "20 MHZ MULTIBUS II PARALLEL SYSTEM BUS INVESTIGATION, TAUFIK MA, INTEL CORPORATION, 8 APRIL, 1991" planned to operate the multibus with a bus frequency of 20 MHz. For this purpose, extensive adaptations and modifications have been proposed in order to optimize the individual runtimes between the controllers and databus drivers or, respectively, between the databus drivers connected via the multibus. The aim of this study is to operate a multibus having 10 assemblies at a maximum and 20 MHz, and to operate a multibus having 20 assemblies at a maximum and 16 MHz. The signal propagation time between the controllers of two assemblies would have to be reduced to 50 ns or less. The result of this study is that such an "accelerated" multibus is theoretically possible, however, there would be a considerable developing outlay until its actual realization. Younger data busses, such as the PCI bus, do not have bus drivers in order to obtain faster access to the signal lines of the databus and therefore obtain a higher throughput. These data busses, however, are limited with respect to the number of assemblies to be connected at a maximum, which is normally clearly smaller than 10, and its physical expanse is limited to 10 cm, for example. On the other hand, a multibus can be up to 50 cm long and can connect 20 assemblies to one another, whereby a plurality of assemblies can represent processor systems of equal rights.

The publication by "Färber, G., Bussysteme, R. Oldenbourg Verlag, Munich 1987 (2. edition)" describes functions and structures of bus systems on the pages 16–19. On page 19, image 13 shows a handshake transmission. The article "Packer, Stephen et. al., Message Passing Supports Multiple Processor Design, Computer Design" of 15 Jun. 1984, pages 117–120, 122 and 124 describes measures for improving the communication in the multibus II.

SUMMARY OF THE INVENTION

An object of the present invention is to create a parallel databus, which allows a high data throughput and which still has the advantages of the known multibus, such as the high number of connectable assemblies, the large physical expanse and the possibility of a multiprocessor architecture. Another object of the present invention is to create a method for the communication between two assemblies, which are respectively provided with a processor, by such a databus.

This object is achieved by a parallel databus having a plurality of parallel signal lines to which a plurality of assemblies can be connected, whereby each assembly has a databus driver being in immediate connection with the signal lines and has a controller that is connected to the databus driver, whereby a sub-number of the signal lines represent data lines for transmitting the data and control lines for controlling the data transmission of the data via the data lines, and a clock generator for generating a predetermined bus frequency, with which the signals transmitted in the signal lines are clocked, the databus drivers are connected to the clock generator and the databus drivers are fashioned such that the signals to be transmitted from and to the data and control lines are accepted during a clock pulse prescribed by the clock generator, and are emitted during a following clock pulse.

In a preferred embodiment, the clock generator generates a bus frequency of at least 20 MHz. Specifically, the clock generator may generate a bus frequency of approximately 40 MHz. In one embodiment, the databus has 32 data lines. A further sub-number of the signal lines are fashioned as decision lines for deciding which assembly connected to the signal lines has access priority, the decision lines are connected to non-clocked open-drain outputs of the respective databus drivers, so that they form a wired-or logic. A device for generating an auxiliary clock pulse with a lower frequency than the bus frequency is provided for driving the decision lines.

The device for generating an auxiliary clock pulse may be a frequency divider. The outputs of the databus driver leading to the controller may be fashioned as low-voltage TTL outputs. The signal lines preferably have a physical expanse of at least 40 cm. The signal lines may have a physical expanse of at least 50 cm. A plurality of the assemblies that are connected to the signal lines are respectively can be provided with a processor. The databus may be multibus-compatible.

The invention also provides a method for the communication of two assemblies, which are each connected to a processor, by means of a parallel databus, whereby data packets are exchanged between the two assemblies, each data packet is acknowledged by only one single handshake. In a preferred embodiment, the method a handshake respectively comprises a data-ready signal of the transmitter assembly and a data-ready signal of the receiver assembly, whereby the data-ready signal of the transmitter assembly is sent to the receiver assembly at the beginning of the data transfer, and the receiver assembly sends its data-ready signal to the receiver assembly after the data-ready signal of the transmitter assembly has been received. The transmitter assembly only sends its data-ready signal when the complete data packet is present on this assembly.

The maximum size of the data packets is preferably set to a predetermined value, and the receiver assembly only sends its data-ready signal when there is sufficient storage space on the receiver assembly. A maximum size of 32 byte, 64 byte, 96 byte or 128 byte are determined for the data packets.

The invention also provides a printer control unit for high-performance printers having an I/O-module, one or more raster modules and a serializer module, whereby the modules each have a processor, the modules are connected to a parallel databus.

The inventive parallel databus has a plurality of parallel signal lines, whereby a plurality of assemblies can be connected thereto, whereby each assembly has a databus driver being in immediate connection with the signal lines and a controller that is connected to the databus driver, whereby a sub-number of the signal lines represent data lines for transmitting the data and control lines for controlling the data transmission of the data via the data lines, and is provided with a clock generator for generating a predetermined bus frequency, with which the signals transmitted in the signal lines are clocked. This parallel databus is characterized in that the databus drivers are connected to the clock generator and in that the databus drivers are fashioned such that the signals to be transmitted from and to the data lines and control lines are accepted during a clock pulse prescribed by a clock generator and are emitted during a subsequent clock pulse. In this way, a signal to be transmitted from one assembly to another assembly, during a first clock pulse, is transmitted from the controller of the transmitter assembly to the databus driver of the transmitter assembly, is transmitted from the databus driver of the transmitter assembly via the signal lines to the databus driver of the receiving assembly during a second clock pulse and is transmitted from the databus driver of the receiving assembly to the controller of the receiving assembly during a third clock pulse. During a clock pulse, the signals are merely transmitted between a controller and a databus driver of an assembly or between two databus drivers of two different assemblies, so that the physical signal path is kept short. These short signal paths allow correspondingly short signal propagation times, which can be kept less than or equal to 25 ns, for example, so that a bus clock pulse, for example, of 40 MHz is possible. As a result thereof, the data throughput is considerably increased, although all advantages known about the multibus are kept.

The method for the communication of two assemblies, which respectively have a processor, by such a parallel databus is characterized in that the data packets are merely acknowledged by one single handshake when the data packets are exchanged between the two assemblies. Therefore, the handshake can be fashioned so as to be distributed over a number of clock pulses, whereas the data packet can be transmitted with maximum transmission speed (=one data word per clock pulse).

BRIEF DESCRIPTION OF THE DRAWINGS

The invention is subsequently explained on the basis of an exemplary embodiment shown in the drawing.

DETAILED DESCRIPTION OF THE PREFERRED EMBODIMENTS

Figure 1:
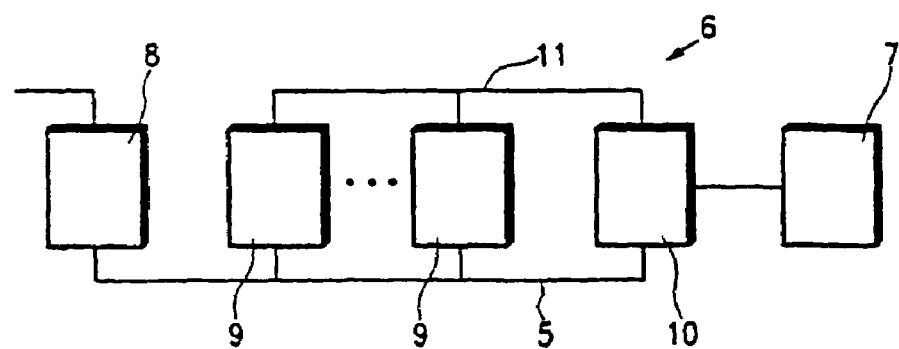
FIG. 1 is a block diagram of a printer control unit with an inventive databus.

The inventive parallel databus 5 is subsequently explained in greater detail on the basis of a printer control unit 6 for high-performance printers 7. Such a printer control unit 6 has an I/O module 8, one or more raster modules 9 and a serializer module 10. The individual modules 8 to 10 are connected to one another via the databus 5. The raster modules 9 and the serializer module 10 are connected to one another via a further pixel bus 11.

The I/O module 8 receives the bits of printing information from a computer means, which can be a large computer system or also a computer network. The I/O module 8 forwards the printing information to the raster modules 9 and the serializer module 10, whereby the raster modules 9 receive the bits of printing format information and convert them into a printing format data stream that can be processed by the high-performance printer 7. These printing format data streams are transmitted by the raster modules 9 via the pixel bus 11 to the serializer module 10, which lines up the data streams in a predetermined sequence and forwards them to the high-performance printer 7.

Figure 2:
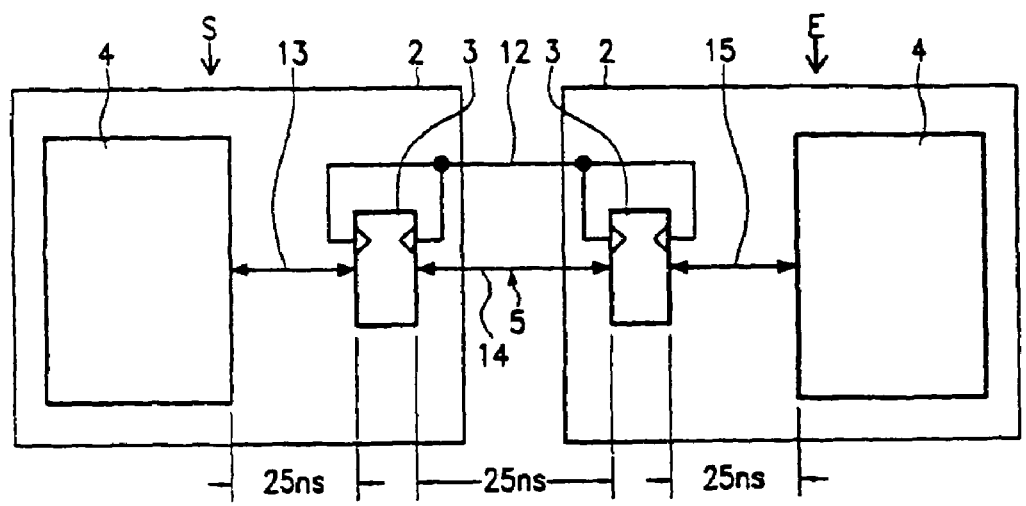
FIG. 2 is a functional block diagram of two assemblies connected via an inventive databus.
Figure 3:
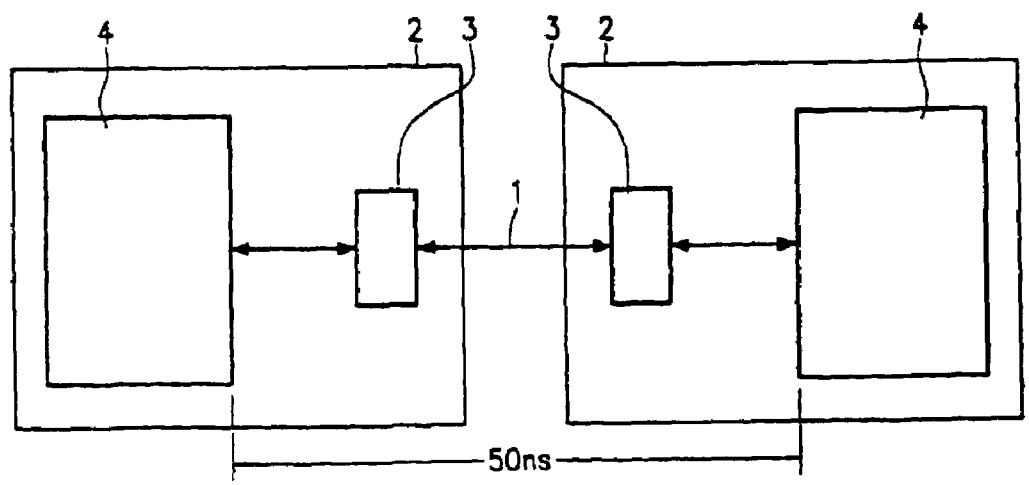
FIG. 3 shows two assemblies connected via a known databus.

The modules 8 to 10 represent assemblies 2 that are respectively connected to the databus 5, whereby each assembly has a databus driver 3 and a controller 4 (FIG. 2). The databus 5 corresponds to the multibus II (multibus is a registered trademark of Intel Corp.), as it is defined in IEEE standard for "High Performance Synchronous 32-Bit Bus: MULTIBUS II The Institute of Electrical and Electronics Engineers, Inc., 345 East 47th Street, NY 10017, USA, 1998", apart from the changed cited in the following description.

The hardware realization of this databus 5 is composed of a backplane, in which the signal lines of the bus are arranged and which are provided with 20 to 25 cable connectors to which an assembly 2 can be respectively connected. The CSM module (Central Services Module), which executes specific start routines and which initializes the individual assemblies, represents such an assembly known from the multibus. The CSM module has a clock generator, which applies a clock signal oscillating with a predetermined bus frequency to a clock signal line of the databus 5. The bus frequency is 40 MHz in the present exemplary embodiment.

The databus drivers 3 of each assembly 2 are connected to the clock signal line 12, whereby the input and output of the databus drivers 3 can be clocked corresponding to the bus frequency or, respectively, the bus clock pulse. In addition to the clock signal line 12, the databus 5 has further lines, such as 32 data lines for transmitting the data, control lines for controlling the data transmission, decision lines for deciding (arbitration), which assembly is allowed to access the databus 5, address lines and one or more lines for the supply voltage and ground. In the present exemplary embodiment, the same lines are used for transmitting the addresses and the data, so that combined address lines/data lines are present.

The databus drivers 3 are inventively connected to the clock signal line 12 and are fashioned such that the signals to be transmitted from and to the data lines and control lines are accepted during a clock pulse prescribed by a clock generator and are outputted during the following clock pulse. The part of the databus driver 3, which operates the data lines and control lines, therefore is fashioned as a non-transparent electronic component with a temporary storing function, as it can be realized by a D-flip-flop, for example. These databus drivers 3, during a clock pulse, therefore accept the signals of the data lines and control lines coming from the databus 5, they store them and output them to the respective controller 4 during the immediately following clock or, respectively, they accept a signal coming from the controller 4 during a clock pulse, they store said signal and apply it to the databus 5 at the immediately following clock pulse. The databus drivers 3 therefore are operated in a "clocked" fashion with respect to the data lines and control lines.

For explanation purposes, it is assumed in the following that the assembly shown in FIG. 2 on the left side (transmitter assembly S) initiates a data transfer to the assembly (receiver assembly E) shown on the right side. In a decision method (arbitration) known from the multibus, the transmitter assembly initially obtains the right to be allowed to access the databus 5. The transmitter assembly S therefore is also referred to as bus owner.

During a first clock pulse, the controller 4 of the transmitter assembly S transmits a data word (1–4 byte) to the databus driver of the transmitter assembly S. The databus driver 3 stores the data word and converts it into a signal that is suitable for the databus 5, whereby said signal is present at the signal lines of the databus 5 during the following, second clock. During the second clock pulse, these electrical data signals are accepted by the databus driver 3 of the receiver assembly 2, they are temporarily stored and are transmitted to the controller 4 of the receiving assembly E during the following, third clock pulse.

This clocked transmission of the signals divides the entire transmission path from the controller 4 of the transmitter assembly S to the controller 4 of the receiver assembly E into three sections, namely the two sections 13, 15 between the controllers 4 and the databus drivers 3 of the respective assembly 2 and the section 14 between the two databus drivers 3 of the two assemblies 2, whereby said section extends across the signal lines of the databus 5. The signal propagation time in the individual sections is significantly shorter than over the entire distance between two controllers, as it is necessary for transparent databus drivers in order to maintain the signal generated at the controller of the transmitter assembly until it is present at the controller of the receiver assembly. Given such a databus, the bus frequency can be significantly increased (e.g. up to 40 MHz) as a result of the inventively shortened signal propagation times of the individual sections, which can be 25 ns, for example. Data transmission rates of up to 160 Mbyte/s can be obtained by a bus frequency of 40 MHz.

The databus drivers can be fashioned, for example, with GTL+–drivers of the company Texas Instruments, such as the module SN54GTL1655 or SN74GTL1655.

The operation of the inventive databus is subsequently explained in greater detail on the basis of the timing diagrams shown in the FIGS. 4 to 12.

Figure 4:
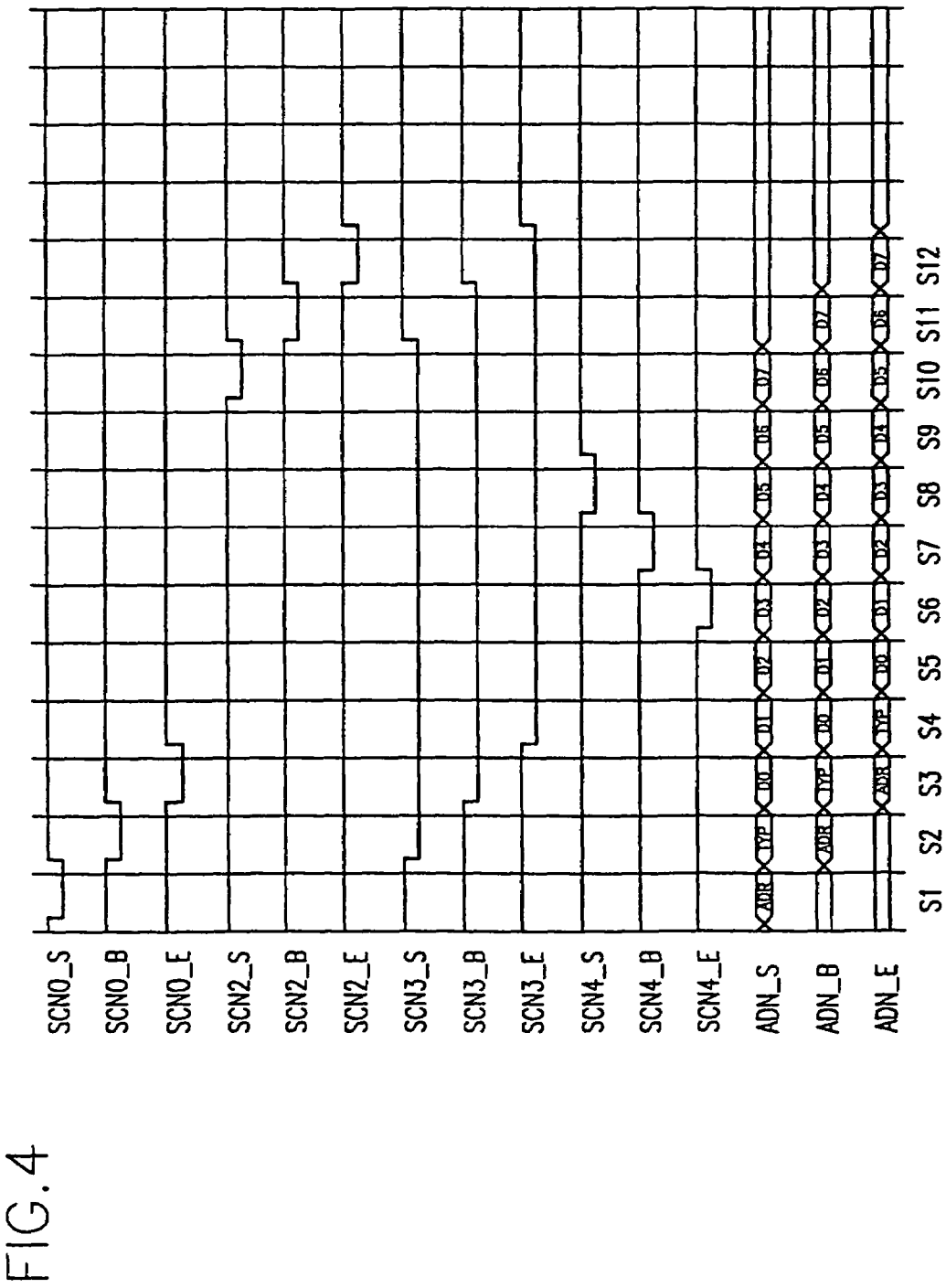
FIGS. 4–12 show timing diagrams for explaining the signal transmission by means of the inventive databus.

FIG. 4 shows the timing diagram for transmitting a data packet between two assemblies on the basis of the control signals SCN0, SCN2, SCN3, SNC4 and the address signals/ data signals AND. The designations of these signals are respectively provided with one of the following endings "_S", "_B" and "_E", whereby "-S" means that the signal status in the line section 13 is shown between the controller 4 and the databus driver 3 of the transmitter assembly S; the ending "_B" means that the signal status in the signal lines of the databus is shown between the databus drivers 3 of the communicating assemblies (line section 14), and the ending "_E" means that the signal in the line section 15 is shown between the databus driver 3 and the controller 4 of the receiver assembly E. The signal SCN0 shows a request phase, whereby the signal is valid in the low status (L request phase). The signal SCN3 indicates the end of the data transmission, whereby the 0/1-transition or, respectively, low/high-transition represents the exact point in time of the end of the data transmission. SCN3 refers to the data-ready signal of the transmitter assembly, and SCN4 refers to the data-ready signal of the receiver assembly E. The two signals SCN3 and SCN4 are the main components of a handshake between the transmitter assembly S and the receiver assembly E. The handshake has signals SCN5, SCN6 and SCN7 allocated, with which the type of error, in a way known from the multibus, is indicated by the receiver assembly E given a faulty data transmission.

The signals AND can comprise 4, 8, 16, 24 or 32 individual signals, for example, whereby the maximum number is limited by the 32 address lines/data lines of the databus 6.

The controller 4 of the transmitter assembly generates the request signal SCN0 at the beginning of a transmission of a data packet and the address of the receiver assembly is outputted (see S1 in FIG. 4). The databus driver 3 of the transmitter assembly applies these signals to the signal lines of the databus 5 during the next clock pulse (S2). The request signal SCN0 and the address data reach the controller 4 of the receiver assembly E during the third clock pulse (S3); the receiver assembly E then realizes that it is to receive a data packet. The signal SCN0 is only generated during the duration of a clock pulse. During the second clock pulse S2, the controller 4 of the transmitter assembly S generates a data-ready signal SCN3, with which it indicates that the transmitter assembly S is ready for sending a data block. An identification character is simultaneously applied to the address lines/data lines for the type of data block. These signals arrive at the controller 4 of the receiver assembly E at the clock pulse S4. After the receiver assembly E has determined the data-ready signal SCN3, it checks whether it has sufficiently free storage space for accepting a data packet. The size of the data packet is fixed at the initialization of the databus and can be 32, 64, 96 or 128 byte. If there is sufficient storage space at the receiver assembly E for accepting a data packet, the controller 4 of the receiver assembly E produces a data-ready signal SCN4, which is transmitted to the controller of the transmitter assembly S during three clock pulses (S6–S8). The receiver assembly E needs two clock pulses for accepting the data-ready signal SCN3 of the transmitter assembly S, for checking whether there is sufficient storage space and for outputting the data-ready signal SCN4. The data-ready signal SCN4 reaches the controller 4 of the transmitter assembly S during the clock pulse S8. The handshake has been acknowledged with the receipt of this signal by the controller 4 of the transmitter assembly S.

The controller 4 of the transmitter assembly S sends data words, which normally comprise 32 bit, during the acknowledgment of the handshake, starting with the clock pulse S3 through the clock pulse S10. The controller 4 hereby sends such a data word per clock pulse, which then, with a delay of two clock pulses, arrive at the controller 4 of the receiver assembly E. The data-ready signal SCN3 of the transmitter assembly S is active until the last data word has been sent. At the same time as the last data word D7 is sent, the controller 4 of the transmitter assembly S activates the control signal SCN2 (low) in order to mark the exact end of the transmission of the data packet at its 0/1-transition (low/high transition). As can be seen from FIG. 4, the SCN2 signal is synchronously transmitted in the individual transmission sections with the data word D7, so that the signal SCN2, during the clock pulse S12, is received by the receiver assembly E and also by the other assemblies connected to the signal lines of the databus 5, so that these recognize that the transmission of the data packet has been completed. A further data packet now can be transmitted between the transmitter assembly and the receiver assembly or the right to access the databus signals can be transferred to another assembly in a decision method (arbitration), which is known from the multibus.

Since each data packet, which can comprise 8 data words, for example, is inventively transmitted by one single handshake, the data words D0–D7 can be transmitted with a maximum transmission rate (one data word per clock pulse), whereas a comparably long period of time of 7 clock pulses (S2–S8), for example, is available for processing the handshake.

Figure 5:
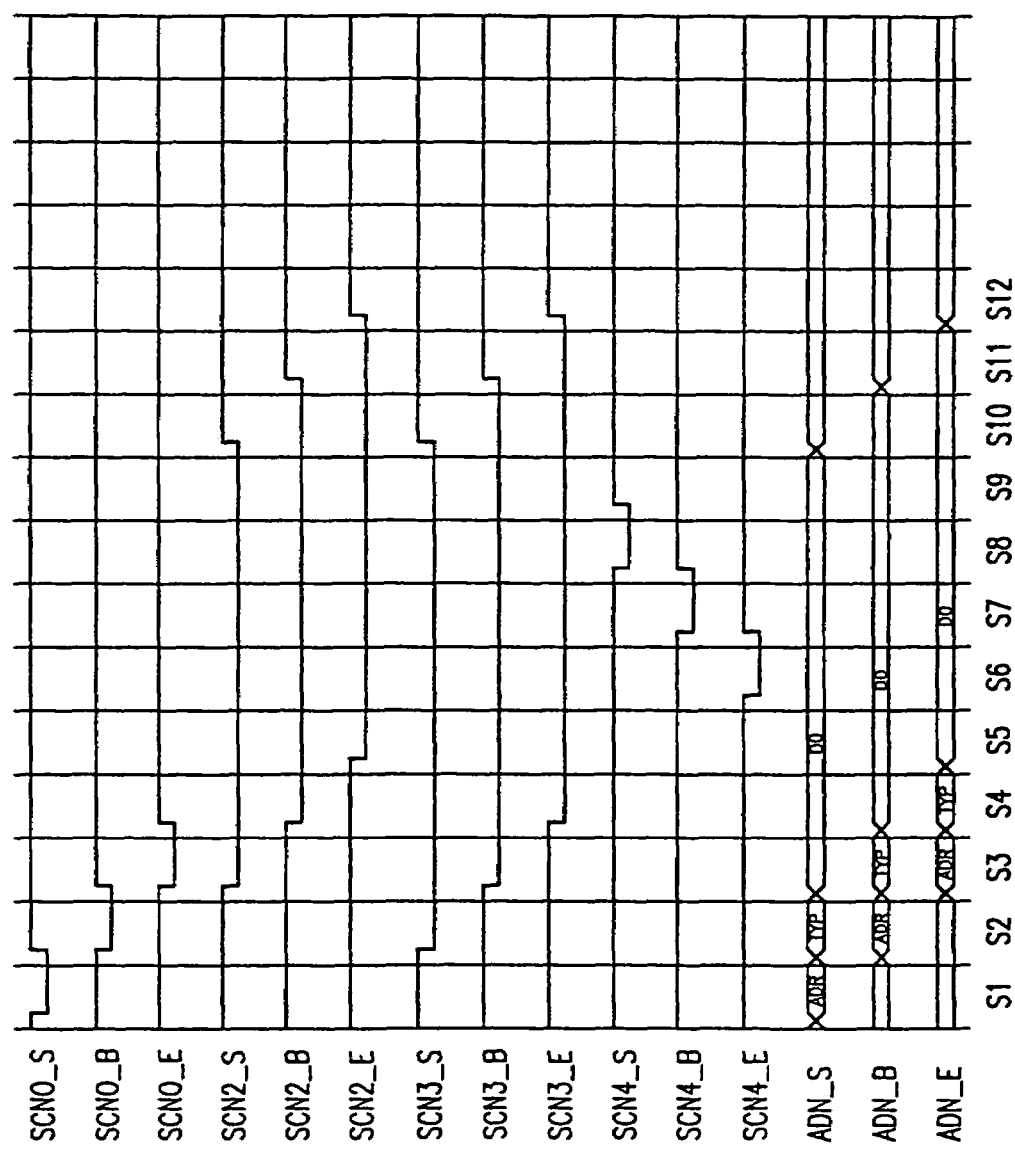

FIG. 5 shows a similar diagram for transmitting a data packet that comprises only one data word D0. The acknowledgment of the handshake by the signal SCN4 is received again at the clock pulse S8 by the controller 4 of the transmitter assembly S (see transmission process explained on the basis of FIG. 4). Only after the handshake has been acknowledged and this acknowledgment signal SCN4 has been processed by the transmitter assembly S (clock pulse S10), the controller 4 of the transmitter assembly S ends the output of the signals representing the data word D0, so that it is assured that the receiver assembly E is capable of receiving the data word D0. Since only one data word D0 is transmitted here, it is the "last" data word of the packet why the control signal SCN2 indicating the end of the data transmission is also actively switched (low) during the entire time during which the data signals of the data word D0 are active.

Figure 6:
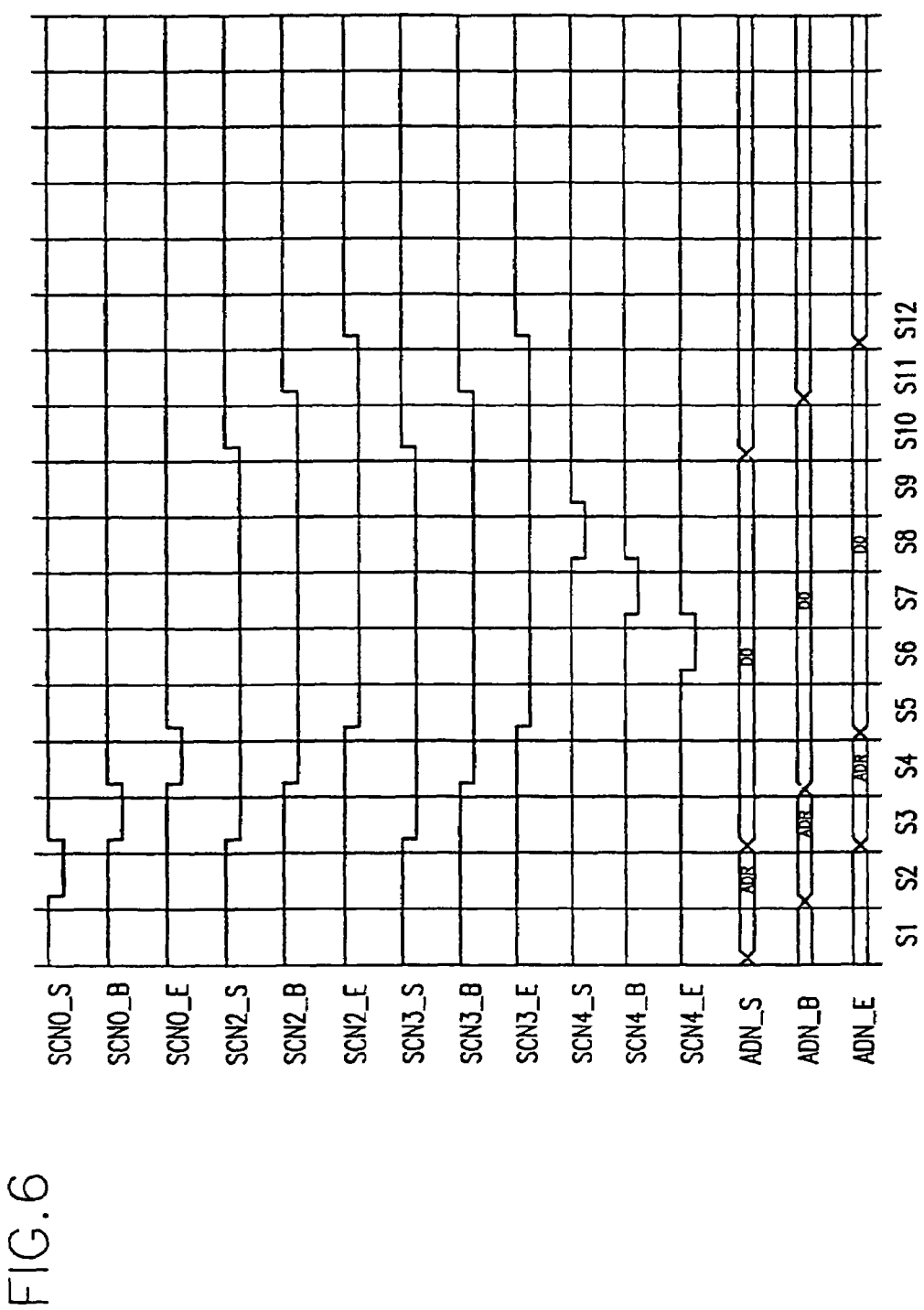
Figure 7:
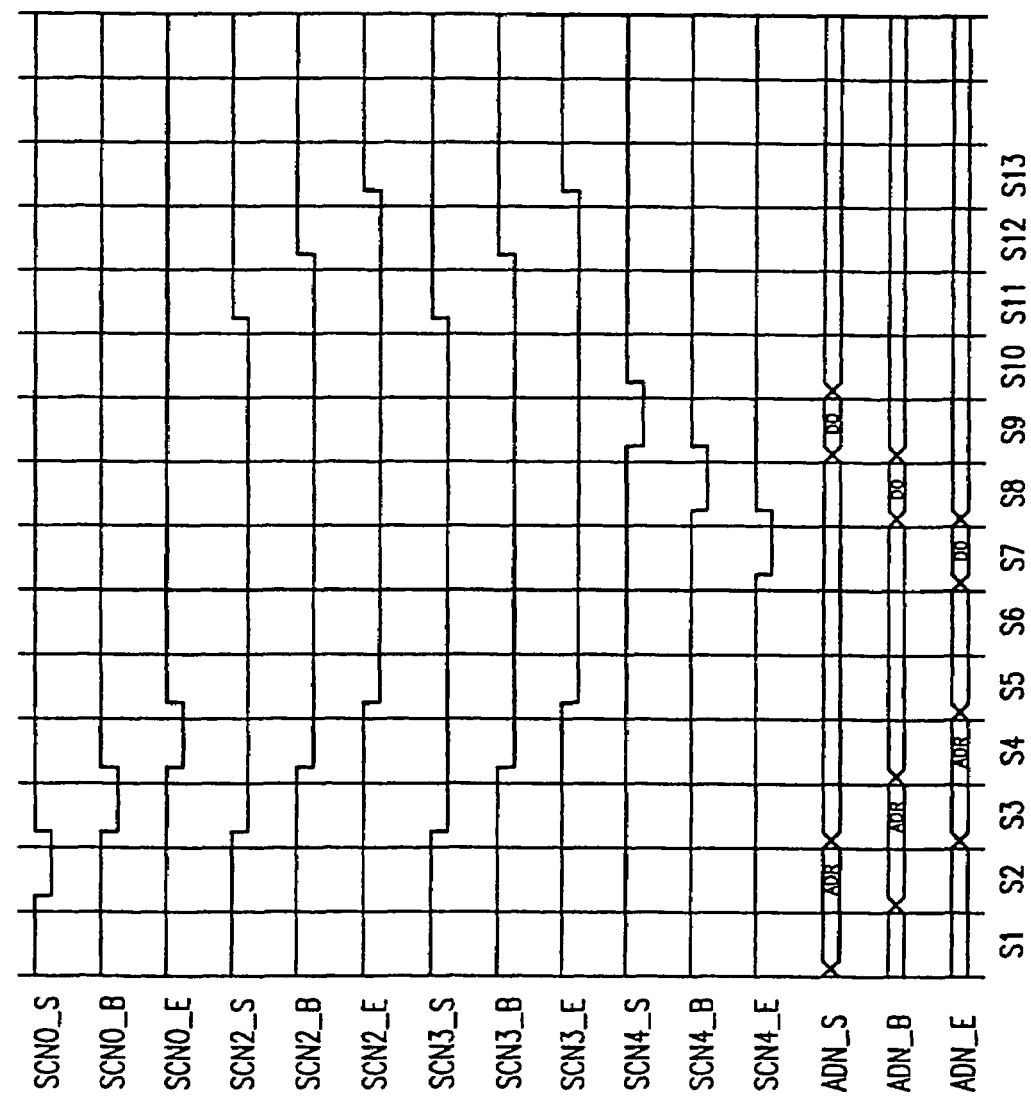

The timing diagrams of FIGS. 6 and 7 show a reference read access and a reference write access. The reference accesses comprise the what is referred to as "I/O-space operation" and the "Memory Space Operations", wherein a transmitter assembly writes a data word in a register or a memory cell of another assembly or, respectively, reads is out from the memory cell.

Given the reference write access (FIG. 6), the process of the control signals SCN0, SCN2, SCN3 and SCN4 exactly corresponds to the process when a data packet having one single data word is transmitted (FIG. 5). The reference write access only differs from this data transfer in that an address ADR composed of two data words is initially transmitted at the address lines/data lines and the data word D0 to be transmitted is subsequently transmitted. A transmitter assembly S initiating a data transfer can read out a memory cell of a receiver assembly E with the reference read access (FIG. 7). In the same way as the previous data transfers, the data transfer is started by initiating a request phase with the control signal SCN0 and by applying an address ADR, which is composed of two data words, to the address lines/data lines. After the request phase, the transmitter assembly S sets the control signals SCN2 and SCN3, whereby it thus indicates that it is ready for accepting the data from the receiver assembly E. The receiver assembly E sends a data word D0 to the transmitter assembly S and simultaneously indicates that the data are valid in that it places the control signal SCN4. The receiver assembly E removes again the data D0 and the control signal SCN4 when it has recognized the set signals SCN2 and SCN3 of the transmitter assembly S. As soon as the transmitter assembly S has recognized the set signal SCN4, it takes over the data D0 and resets the control signals SCN2 and SCN3. The data transfer is completed.

Figure 8:
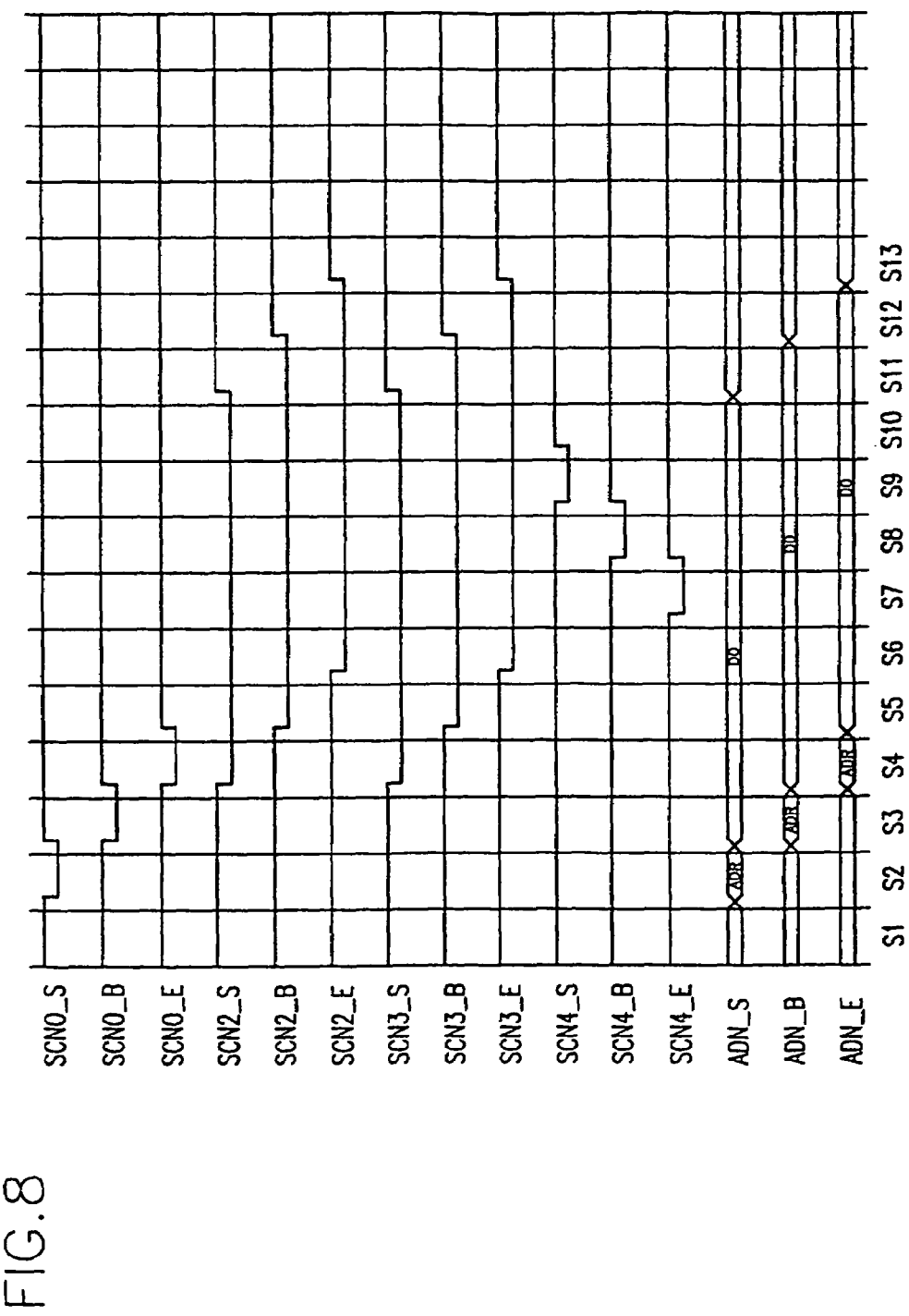
Figure 9:
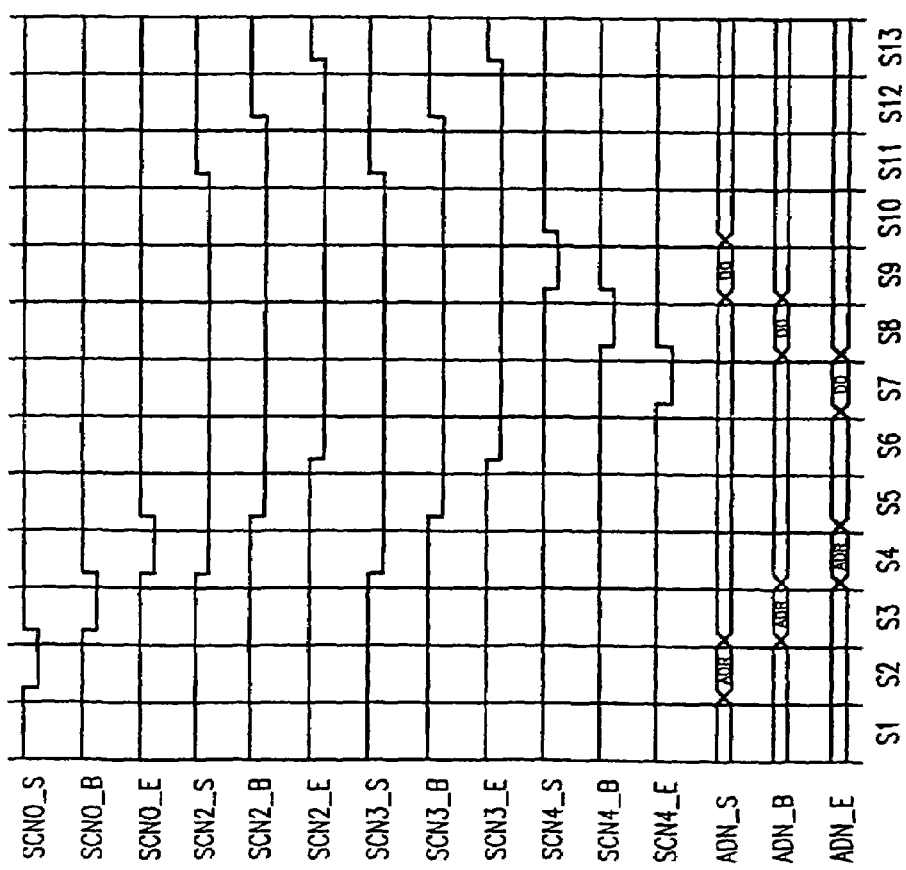

The FIGS. 8 and 9 show the timing diagrams of an interconnect write access and of an interconnect read access. On the basis of these interconnect accesses, a data word can be respectively entered or, respectively, read out in a what is referred to as interconnect storage space, which is provided at each assembly. The memory cells of this storage space are addressed with an address ADR that is only composed of a data word. The interconnect accesses therefore differ from the reference accesses with respect to the size of the address, whereby the operational sequence of the control signals SC0, SCN2, SCN3, SCN4 corresponds to the transmission of the respective data word D0.

The reference access and interconnect access is of secondary importance for the bus systems, which respectively connect assemblies that are provided with a processor, since an interprocessor communication is only possible by means of the above-described data packets (messages). Given multiprocessor systems, the reference access and the interconnect access only serve the purpose of initializing and diagnosing the system or, respectively, are for the communication with periphery devices, which do not have a separate processor control.

As it is known from the multibus, the control signals ARB (5 . . . 0) and a bus request signal BREQ (bus request) are used for the decision (arbitration). In contrast to the address signals/data signals and the control signals, these signals are not clocked-in, since the decision lines then cannot be used in a "wired-or-modus", which is used for deciding the access rights. The databus driver therefore is transparent for these signals. Since one clock pulse period is not sufficient as signal runtime from one controller to the other controller for transmitting the signals, the databus is provided with an additional clock pulse signal line, whereby an auxiliary clock pulse BCLK2 is applied thereto. The auxiliary clock pulse BCLK2 (20 MHz) is generated by dividing the bus frequency by two.

The signals ARB (5 . . . 0) and BREQ are generated by the assemblies in the high-phase of the auxiliary clock pulse and are also queried in the high-phase of the auxiliary clock pulse BCLK2. It is thus assured that at least two clock pulse periods of the bus frequency or, respectively, of the bus clock pulse are available to the signals as signal runtime.

Figure 10:
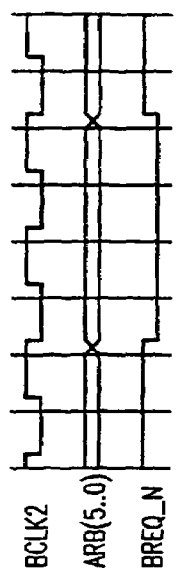

As shown in FIG. 10, four clock pulses of the bus clock pulse or, respectively, two clock pulses of the auxiliary clock pulse are used at a minimum for the transiency of the decision signals. This period of time that is available to the decision signal for the transiency can be extended to 18 clock pulses of the bus frequency at a maximum.

Figure 11:
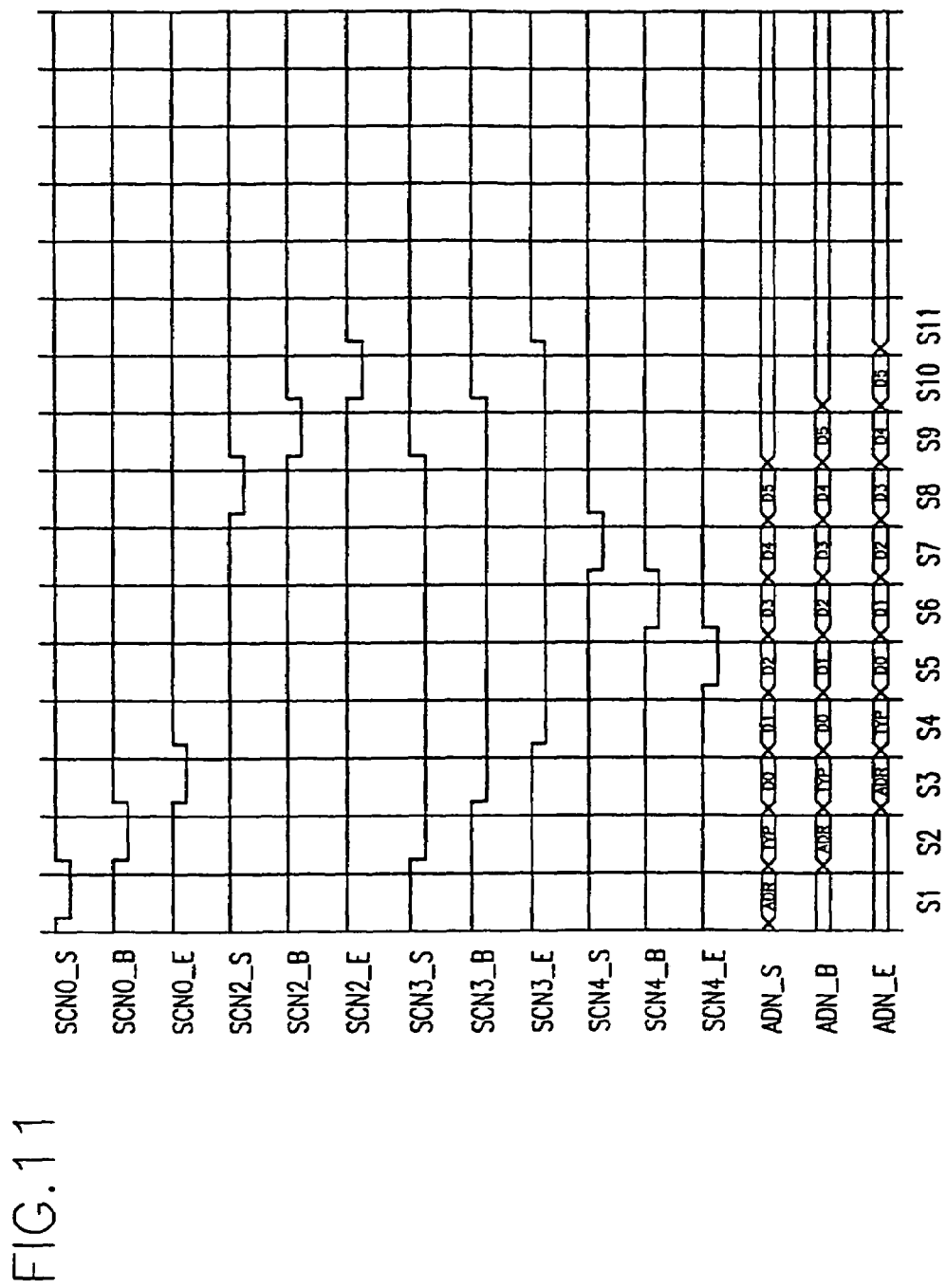

FIG. 11 shows a diagram showing the termination of a data transmission due to an error generated at the receiver assembly E. When the receiver assembly E notices an error, it outputs an error code at the same time as the data-ready signal SCN4 by means of the control signals SCN4 to SCN7 (not shown). The error code outputted by the signals SCN5 to SCN7 corresponds to the error code known from the multibus.

When the receiver assembly E recognizes the error code, it modifies the data transfer in that it sets the control signal SCN2. The data transfer is completed when the receiver assembly E recognizes the set control signal SCN2.

It is differentiated between what are referred to as bus errors, which generally occur in the databus system, vis-a-vis the errors generated with respect to the assemblies. Given the inventive databus, the error signal BUSERR can be only set by the assemblies, which are a part of the respective data transfer, i.e., the transmitter assembly S and the receiver assembly E. All other assemblies connected to the databus are either in a resting state or are in the decision phase (arbitration). They must leave the arbitration phase and start again when a bus error occurs. The assemblies set the error signal BUSERR when a parity error is present at the address/data signals or control signals or when the bus protocol has been injured with respect to the control signals. This is to assure that the data arriving at an assembly are correct. Given a data transmission by means of a data packet, a writing interconnect access and a writing reference access, the error signal BUS ERR is generated by the receiver assembly. Given a reading interconnect access and a reading reference access, wherein a data word is transmitted from the receiver assembly to the transmitter assembly, the error signal BUSERR is generated by the transmitter assembly.

It is important about the inventive databus that all signals of a transmitter assembly are clocked-in three times before they can be processed by the receiver assembly. This is the reason why a bus error is always recognized two or three clock pulses later, depending on whether the error has occurred on the transmitter assembly or on the databus. In this case, the receiver assembly sets the error signal BUSERR. Given a reading interconnect access or reading reference access, the error occurs on the receiver assembly, whereby the transmitter assembly sets the error signal BUSERR in the case of an error.

The chronological delay of the error signal is taken into consideration in that the controller of the transmitter assembly, which sends a data packet or carries out an access, waits for six clock pulses after the end of the data transfer until it informs the CPU of the assembly of the status of the data transfer, since an error signal can still arrive at this time.

Since only one single handshake inventively occurs for each data transfer, only this one single handshake, i.e. the data-ready signal SCN4, can be checked, so that modifications result vis-a-vis the known multibus protocol.

The parity check is carried out at the subsequently described points in time:
1. Control signals are always checked.
2. Address signals/data signals are checked during the request phase.
3. Address signals/data signals are checked during a response phase of a read access following the request phase when SCN4 is set and SCN (7 . . . 5) is not set, i.e., when a correct handshake is present.
4. Address signals/data signals are checked during the response phase of a write access when SCN3 is set and when SCN (7 . . . 5) is not set, i.e., a correct handshake is present.

A databus protocol injury is determined when
1. SCN0 is set during a response phase,
2. SCN2 is set in the response phase and SCN3 is not set in the response phase,
3. SCN5, SCN6 or SCN7 are set during the response phase and SCN4 is not set,
4. SCN2 changes during the response phase, whereas SCN3 remains set, and
5. more data words than fixed during the configuration of the databus system are sent during a data transfer by means of data packets.

Figure 12:
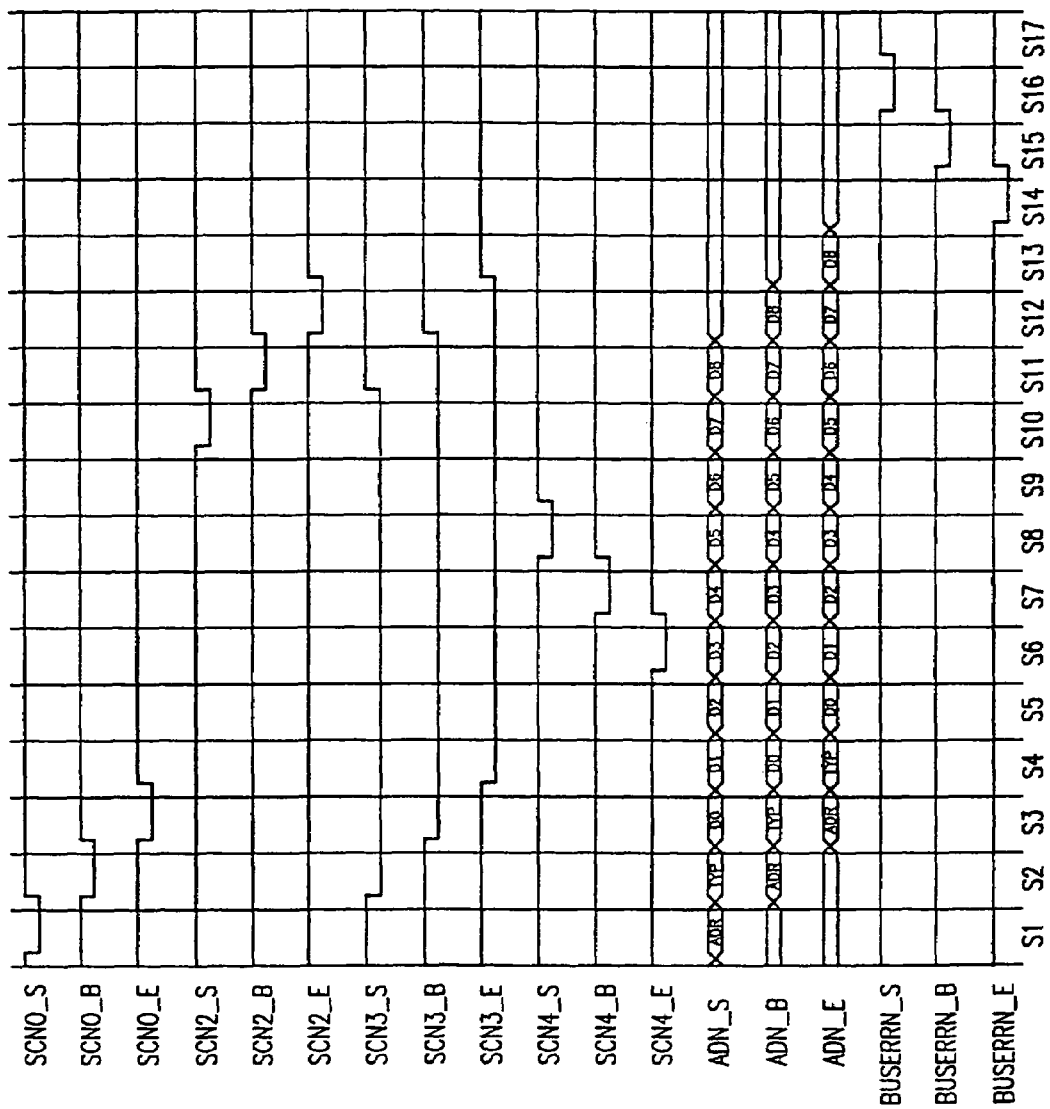

The multibus protocol treats the error described in point 5 as an error occurring at an assembly. Since the data transfer can be no longer continued after this error has occurred and since the error normally occurs after the handshake given the inventive method with one single handshake, it is evaluated as a bus error. Such a bus error with respect to a data transfer by a data packet is shown in the diagram of FIG. 12. Nine data words are transmitted here instead of eight data words. Therefore, the receiver assembly sets the error signal BUSERR after the eighth data word D7. As can be seen from the timing diagram, the transmitter assembly has already completed the data transfer on its side before it is informed of the error by the receiver assembly. As a result thereof, the controller of the transmitter assembly must wait for six clock pulses until it can announce the completion of the transfer to the CPU of the assembly, since error messages of the receiver assembly can still arrive within this period of time.

The invention is not limited to a databus that is similar to the multibus but can be utilized for each parallel databus.

The invention can be summarized as follows:

It relates to a parallel databus having a plurality of parallel signal lines to which a plurality of assemblies can be connected, whereby each assembly has a databus driver being in immediate connection with the signal lines and has a controller that is connected to the databus driver. This databus is based on the known MULTIBUS II. The invention is characterized in that the databus drivers are connected to the clock generator of the databus, and that the databus drivers are fashioned such that the signals to be transmitted from and to the data and control lines are accepted during a clock pulse that is predetermined by the clock generator, and are emitted during the following clock pulse. As a result thereof, the signaling path between two assemblies connected via the databus is interrupted at the databus drivers, so that the signals cover a shorter path section during a clock pulse of the databus compared to conventional databuses with transparent databus drivers. The individual signal propagation times are thus reduced, so that the bus frequency of the databus and therefore the data throughput can be significantly increased.

The invention also relates to a method for the communication of two assemblies that are each provided with a processor, whereby data packets are exchanged between the assemblies. The inventive method is characterized in that each data packet is acknowledged by only one single handshake. As a result of this method, data can be transmitted with a maximum transmission rate at the databus.

Although other modifications and changes may be suggested by those skilled in the art, it is the intention of the inventors to embody within the patent warranted hereon all changes and modifications as reasonably and properly come within the scope of their contribution to the art.

We claim:

1. A parallel databus assembly, comprising:
a plurality of parallel signal lines;
a plurality of assemblies connected to said plurality of parallel signal lines, each of said assemblies having
a databus driver being in immediate connection with said signal lines, and
a controller connected to said databus driver,
at least some of said plurality of parallel signal lines being at least one of data lines for transmitting data and control lines for controlling data transmission of the data via said data lines,
a clock generator generating a predetermined bus frequency with which signals transmitted in said signal lines are clocked,
said databus drivers being connected to said clock generator, said databus drivers being fashioned such that signals to be transmitted over said data lines and said control lines are accepted during a clock pulse prescribed by said clock generator and are emitted during a further clock pulse following said clock pulse, said databus driver being a non-transparent electronic device.

2. A parallel databus assembly according to claim 1, wherein said clock generator generates a bus frequency of at least 20 MHz.

3. A parallel databus assembly according to claim 2, wherein said clock generator generates a bus frequency of approximately 40 MHz.

4. A parallel databus assembly according to claim 1, wherein said databus has 32 data lines.

5. A parallel databus assembly according to claim 1, wherein further ones of said plurality of parallel signal lines are fashioned as decision lines for deciding which of said plurality of assemblies connected to said parallel signal lines has access priority, and
said databus drivers having non-clocked open-drain outputs connected to said decision lines a wired-or logic is formed.

6. A parallel databus assembly according to claim 5, further comprising:
a device for generating an auxiliary clock pulse with a lower frequency than the bus frequency is provided for driving the decision lines.

7. A parallel databus assembly according to claim 6, wherein said device for generating an auxiliary clock pulse is a frequency divider.

8. A parallel databus assembly according to claim 1, wherein outputs of the databus driver leading to the controller are fashioned as low-voltage TTL outputs.

9. A parallel databus assembly according to claim 1, wherein said signal lines have a physical expanse of at least 40 cm.

10. A parallel databus assembly according to claim 1, wherein said signal lines have a physical expanse of at least 50 cm.

11. A parallel databus assembly according to claim 1, further comprising:
a processor for a plurality of the assemblies that are connected to the signal lines.

12. A parallel databus assembly according to claim 1, wherein said databus is multibus-compatible.

* * * * *